(No Model.)
N. F. HUMPHREY.
BROILER.
No. 263,339.
Patented Aug. 29, 1882.
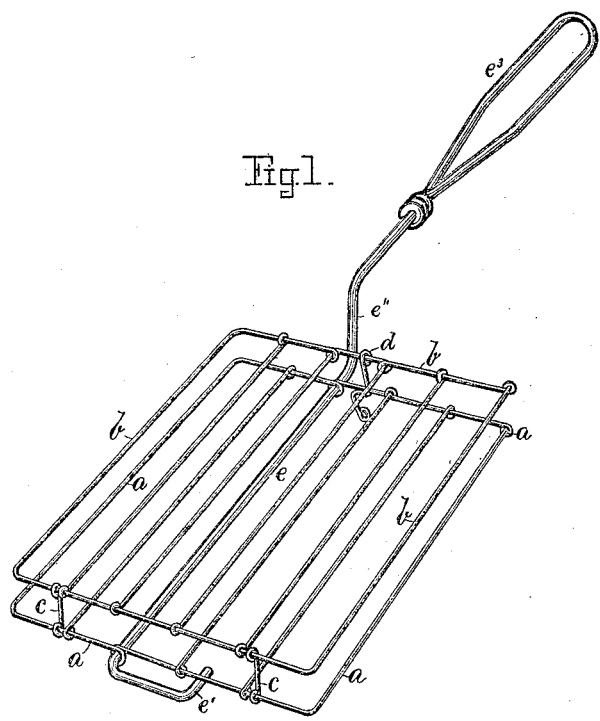
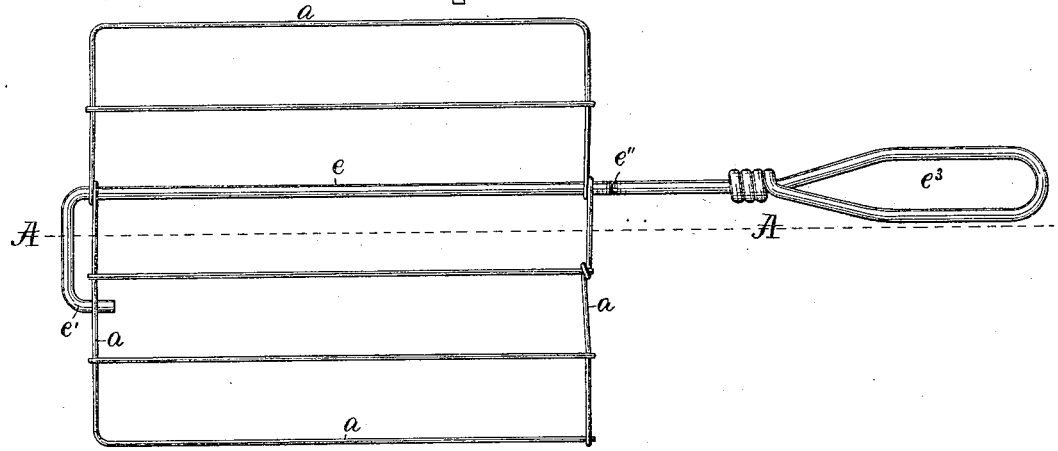
Witnesses.
Henry Chadbourn.
Chas. N. Conant
Inventor.
Nelson F. Humphrey
by Alban Andrew
his atty.

UNITED STATES PATENT OFFICE.

NELSON F. HUMPHREY, OF WEYMOUTH, MASSACHUSETTS.

BROILER.

SPECIFICATION forming part of Letters Patent No. 263,339, dated August 29, 1882.

Application filed March 11, 1882. (No model.)

*To all whom it may concern:*

Be it known that I, NELSON F. HUMPHREY, a citizen of the United States, residing at Weymouth, in the county of Norfolk and State of Massachusetts, have invented certain new and useful Improvements in Broilers; and I do hereby declare that the same are fully described in the following specification and illustrated in the accompanying drawings.

This invention relates to improvements in reversible broilers; and it is carried out as follows, reference being had to the accompanying drawings, on which—

Figure 1 represents a perspective view of the improved broiler; and Fig. 2 represents a plan view, the hinged cover being removed.

Similar letters refer to similar parts wherever they occur on the different parts of the drawings.

$a$ represents the lower wire part of the broiler, to which is hinged the movable wire cover $b$ by means of the wire loops or hinges $c\ c$, as usual. $d$ represents the ordinary wire or other clasp hinged to the cover $b$, and adapted to lock the upper and lower parts of the broiler together, with the food held between them as usual.

A A in Fig. 2 represent the central longitudinal line of the lower part, $a$, of the broiler. On one side of the central line, A A, is located the wire spindle $e$, which passes loosely through eyes in two opposite ends of the part $a$, as shown. The outer end of the spindle $e$ is provided with a return-bend, $e'$, which passes under the part $a$ and serves as a stop to prevent the broiler from tipping over when in use. The inner end of the spindle $e$ is bent upward at $e''$, terminating as a handle, $e^3$, as shown, by which the broiler may be held when in use. Instead of a wire handle, a wooden or other handle may be used to equal advantage.

The advantage of the bend $e''$ of the spindle $e$ is that the broiler, when in use, may be brought in close proximity to the burning coals in the fire-pot of a stove, and so that it may be held in a horizontal position when in the act of broiling, and thus prevent one end of the meat or bread from being burned or charred. By having the spindle $e$ passing loosely through eyes or loops in the ends of the broiler part $a$ the broiler is made reversible, so that by merely turning or swinging it half a revolution on its axis $e$ either side of the food to be toasted or broiled may be brought in contact with the live heat in the fire-pot. The return-bend $e'$ of the spindle $e$ serves as a stop against the part $a$ when the latter is in either its upper or in its lower position, and as the wire spindle $e$ is hinged to the broiler part $a$ on one side of its central line, A A, it will easily be perceived that the weight of the food held in the broiler causes the latter to be suspended on the spindle $e$ in a horizontal position, as the return-bend and stop $e'$ prevent it from going any farther until it is reversed half a revolution to allow the food to be toasted or broiled on its opposite side.

I am aware that broiler-handles have heretofore been bent so as to enable the food on the broiler to be brought in close contact with the fire in the stove; and I do not claim such as my invention.

I am also aware that reversible broilers have heretofore been made with the spindle on which it swings arranged centrally with the broiler, and I desire to state that I do not claim such as my invention; but What I wish to secure by Letters Patent, and to claim, is—

The herein-described reversible broiler, consisting of the bent handle $e''\ e^3$, the spindle $e$, hinged to the broiler part $a$ on one side of the center line, A A, and provided with the return-bend and stop $e'$, in combination with the hinged cover $b$, as and for the purpose set forth.

In testimony whereof I have affixed my signature in presence of two witnesses.

NELSON F. HUMPHREY.

Witnesses:
 E. V. LOUD,
 GEO. W. RUHET.